Aug. 26, 1924.

E. CHAPMAN

BLOCK SURFACING MACHINE

Filed March 19, 1923

1,505,947

Inventor

Earl Chapman,

By R. J. Bassett

Attorney

Patented Aug. 26, 1924.

1,505,947

UNITED STATES PATENT OFFICE.

EARL CHAPMAN, OF OAKLAND, CALIFORNIA, ASSIGNOR OF ONE-HALF TO FRANK McCARROLL, OF BOISE, IDAHO.

BLOCK-SURFACING MACHINE.

Application filed March 19, 1923. Serial No. 626,129.

*To all whom it may concern:*

Be it known that I, EARL CHAPMAN, a citizen of the United States, residing at Oakland, California, have invented certain new and useful Improvements in Block-Surfacing Machines, of which the following is a specification.

This invention relates to improvements in block dressing machines and more particularly to an improved mechanism for re-surfacing meat blocks and the like.

The primary object of the invention is to provide a block-surfacing machine including a portable carriage which may be placed on the meat block or the like and which may be universally moved over the surface of the meat block without the necessity of employing special guides such as are ordinarily clamped to the meat block.

A further object is to furnish a block-surfacing machine having a carriage so constructed and weighted that the saw will always travel in a horizontal plane, this being ensured by the carriage remaining in a horizontal plane while the machine is moved over the meat block.

A still further object is to provide a block-surfacing machine having improved means for supporting the saw-blade and its motor, said means being adapted also to facilitate the gathering of the saw-dust.

Another object is to furnish improved means for adjusting the saw-blade so that the depth of the cut may be regulated.

With the foregoing objects outlined and with other objects in view which will appear as the description proceeds, the invention consists in the novel features hereinafter described in detail, illustrated in the accompanying drawing and more particularly pointed out in the appended claims.

Referring to the drawing.

Figure 1:
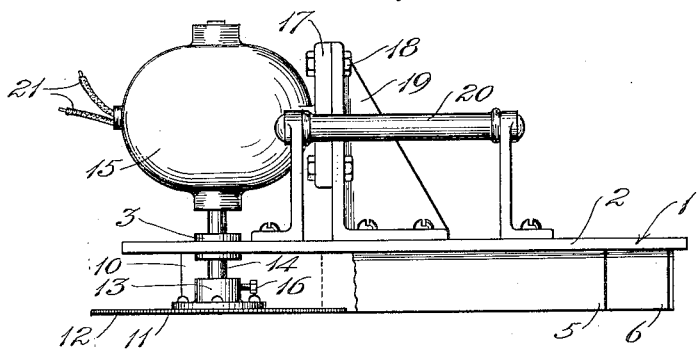
Figure 1 is a side view of the improved machine partly broken away for the purpose of illustration.
Figure 2:
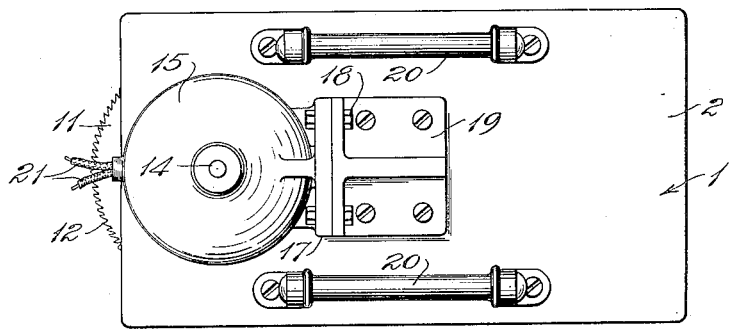
Fig. 2 is a top plan view of the machine.
Figure 3:
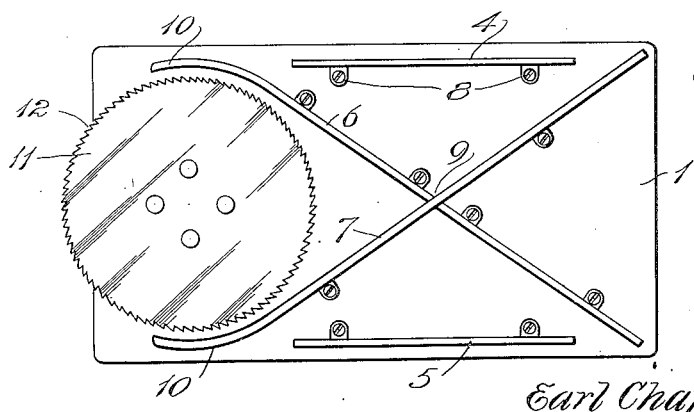
Fig. 3 is the plan view of the under side of the machine.

In the drawings, 1 designates the carriage of the improved machine, which is preferably formed of a horizontally disposed plate 2 provided with a bearing boss 3, and having on its under side vertical runners 4, 5, 6 and 7. These runners are detachably secured in place by means of screws or the like 8, and the runners 4 and 5 are arranged parallel to one another to facilitate longitudinal movement of the carriage. The runners 6 and 7 are crossed at 9 so that they form a practically X-shaped structure. This arrangement of runners 6 and 7 ensures an even supporting of the carriage on the meat blocks or the like and prevents wabbling or vibration of the carriage. The forward ends of the runners 6 and 7 are curved as shown at 10 and these curved portions function as a guard for the saw blade 11 and also act to gather the saw-dust.

The saw blade is preferably of circular shape and has teeth 12 at its edge. The central portion of the blade is provided with a socket 13 which is adjustably mounted on the shaft 14 of a motor 15. A set screw 16 functions to retain the socket in its adjusted positions axially of the shaft 14. The set screw 16 also permits the detachment of the saw-blade when necessary. The shaft of the motor is journaled in the bearing 3, and the casing of the motor preferably has a bracket 17 detachably connected by bolts 18 to a bracket 19 arranged on the upper surface of the plate 2. Handles 20 are arranged on the upper surface of the plate 2 at opposite sides of the bracket 19 and in use the operator grasps these handles while he is moving the carriage over the surface of the block to be dressed. The motor 15 is preferably moved by electricity conducted by the wires 21. In operation, the operator adjusts the saw to make a cut of the desired depth, and he then places the machine on the block to be dressed. Then the motor is started and the operator moves the carriage over the block in various directions. During this movement the portion of the carriage at the right hand side of the bracket 19 counter-balances the weight of the motor and the saw-blade at the opposite side of the bracket, so that there is no likelihood of the device tipping longitudinally and causing uneven cutting. The runners 4 and 5 also coact to prevent lateral tipping of the carriage, while the runners 6 and 7 tend to keep the machine on an even keel.

From the foregoing it is believed that the construction, operation and advantages of the invention may be readily understood and it is apparent that various changes may be made in the construction disclosed without departing from the spirit of the invention as expressed in the claims.

What is claimed and desired to be secured by Letters-Patent is:

1. A block-surfacing machine including a horizontal suporting plate, vertical runners arranged in crossed relation beneath said plate and supporting the latter parallel vertical runners provided on the under side of said plate and arranged near the opposite side edges of the plate, a circular saw-blade arranged to rotate partially between said crossed runners, a motor carried by said plate, a shaft for said motor on which the saw blade is mounted, and handles provided on the upper side of the plate to enable the operator to move the machine universally over the surface to be dressed.

2. A block-surfacing machine including a horizontally disposed supporting plate having a bearing boss near one of its ends, a bracket mounted on the upper side of the plate intermediate the ends of the latter, a motor carried by said bracket and arranged near one end of the supporting plate, a shaft for said motor extending through said bearing boss, a horizontally disposed circular saw-blade connected to the lower end of said shaft, handles provided on the upper side of said plate to permit the operator to move the plate universally over the surface to be dressed, crossed runners supporting said plate and partially enclosing said saw, and other parallel runners arranged beneath the plate and located adjacent the side edges of the plate.

In testimony whereof I hereunto affix my signature.

EARL CHAPMAN.